United States Patent
Werth et al.

(10) Patent No.: US 8,740,150 B2
(45) Date of Patent: Jun. 3, 2014

(54) CONNECTION OF A WING TO A FUSELAGE OF AN AIRPLANE

(75) Inventors: Frank Werth, Stuhr (DE); Andreas Poppe, Reessum (DE); Hermann Benthien, Sottrum (DE); Bernd Beschorner, Schwarme (DE)

(73) Assignee: Airbus Operations GmbH, Hamburg (DE)

( * ) Notice: Subject to any disclaimer, the term of this patent is extended or adjusted under 35 U.S.C. 154(b) by 90 days.

(21) Appl. No.: 13/058,552

(22) PCT Filed: Aug. 18, 2009

(86) PCT No.: PCT/EP2009/060660
§ 371 (c)(1),
(2), (4) Date: May 6, 2011

(87) PCT Pub. No.: WO2010/020632
PCT Pub. Date: Feb. 25, 2010

(65) Prior Publication Data
US 2011/0210206 A1    Sep. 1, 2011

Related U.S. Application Data

(60) Provisional application No. 61/189,361, filed on Aug. 18, 2008.

(30) Foreign Application Priority Data

Aug. 18, 2008  (DE) .......................... 10 2008 041 317

(51) Int. Cl.
*B64C 1/26* (2006.01)
(52) U.S. Cl.
USPC ......................................... 244/131

(58) Field of Classification Search
USPC ........................................................ 244/131
See application file for complete search history.

(56) References Cited

U.S. PATENT DOCUMENTS

| 2,538,433 | A |   | 1/1951 | Snyder |         |
|-----------|---|---|--------|--------|---------|
| 4,944,531 | A | * | 7/1990 | Knabel et al. | 280/806 |

(Continued)

FOREIGN PATENT DOCUMENTS

| DE | 197 19 915 | 12/1998 |
| DE | 10 2005 034 891 | 2/2007 |

(Continued)

OTHER PUBLICATIONS

Michael C.Y. Niu, "Airframe Structural Design, $2^{nd}$ Edition, ISBN 962-7128-09-90 Passage", *Airframe Structural Design*, Conmilit Press, Hong Kong, HK, Feb. 1, 2002, pp. 408-409.
Office Action of German Priority Application No. 10 2008 041 317.8.

*Primary Examiner* — Joseph W Sanderson
*Assistant Examiner* — Marc Burgess
(74) *Attorney, Agent, or Firm* — Greer, Burns & Crain Ltd.

(57) ABSTRACT

An aerofoil connection on a fuselage airframe comprising a plurality of double-jointed coupling members. In each case at least two z-coupling members extending substantially parallel to a vertical axis of the aircraft and in each case at least two xz-coupling members are arranged in the region of two longitudinal edges of a fuselage airframe recess wherein the xz-coupling members are configured in each case for a first maximum of a load in the event of a crash and of a load in normal flight operation parallel to a longitudinal axis of the aircraft, and for a second maximum of a load in the event of a crash and of a load in normal flight operation parallel to the vertical axis. The xz-coupling members are capable of absorbing force components parallel to the x-axis as well as force components which arise parallel to the z-axis.

11 Claims, 3 Drawing Sheets

(56) References Cited

U.S. PATENT DOCUMENTS

| | | | | |
|---|---|---|---|---|
| 6,095,456 | A | * | 8/2000 | Powell .......................... 244/54 |
| 7,066,429 | B2 | * | 6/2006 | Mellor et al. ............. 244/102 R |
| 2011/0266398 | A1 | * | 11/2011 | Voss et al. ................... 244/45 R |

FOREIGN PATENT DOCUMENTS

| | | |
|---|---|---|
| DE | 10 2006 051 572 | 5/2008 |
| DE | 10 2006 051572 | 5/2008 |

* cited by examiner

CONNECTION OF A WING TO A FUSELAGE OF AN AIRPLANE

CROSS-REFERENCE TO RELATED APPLICATIONS

This application claims the benefit of U.S. Provisional Application No. 61/189,361, filed Aug. 18, 2008 and German Patent Application No. 10 2008 041 317.8, filed Aug. 18, 2008, the entire disclosures of which are herein incorporated by reference.

FIELD OF THE INVENTION

The invention relates to a connection of an aerofoil to a fuselage airframe of an aircraft, in particular a high-wing aircraft, comprising a plurality of coupling members, and to a method for the construction of such a connection.

The connection of an aerofoil to the fuselage airframe of an aircraft, in particular to that of a high-wing aircraft must satisfy a large number of basic constructive conditions, but as a result can always be a compromise. For, the higher the aerofoil is positioned on the fuselage, for example, the more space is available between the engines, the aerofoil fairings and the floor space. In order not to impair the structural function of the aerofoil, an upper shell of the fuselage airframe in particular is generally opened in a connection region, with the formation of a recess in the fuselage airframe. In the region of the fuselage airframe recess, the aerofoil is connected to the fuselage airframe by a plurality of coupling members, so that the fuselage airframe is finally suspended from the aerofoil.

The lower the aerofoil is attached relative to the fuselage airframe, the larger the fuselage airframe recess which is inevitably required for this purpose, thereby adversely affecting the static characteristics of the fuselage airframe. In particular, a relatively low positioning of the aerofoil has the disadvantage that a greater constructive effort is required to seal the resulting fuselage airframe recess, the area of which is relatively large. However, re-sealing is essential, because the fuselage airframe must, inter alia, reliably absorb a differential pressure (internal pressure) which is greatly increased compared to the ambient air pressure at high flight altitudes and approximately corresponds to a height of from 2,000 to 12,000 m above sea level, as well as the landing and manoeuvring loads which arise in general flight operation.

During flight operation, an aerofoil connection has to transfer a broad spectrum of very different loads. Loads in the direction of flight occur in particular due to the acceleration and deceleration of the aircraft and to an increased extent in extreme flight situations or in authorisation provisions, for example in the "event of a crash". In such a crash situation, accelerations of up to 9 g in the direction of flight are assumed, so that the mechanical loading capacity of the aerofoil connection must be configured up to three times higher with respect to crash loads than is actually required by the loads which occur during normal flight operation, thereby entailing a substantial excess weight. In view of the loads which determine the dimensioning, in particular coupling elements for absorbing the loads in the direction of flight must be configured to be very solid and thus heavy.

Furthermore, an aerofoil connection must generally be configured such that it is redundant, in other words, if an individual coupling member fails, under no circumstances must the aerofoil become detached, completely or at least in part, from the fuselage airframe.

Known embodiments of aerofoil connections generally have a plurality, in particular as many as 32 coupling members which are each specifically configured for one load direction, i.e. for diverting mechanical loads parallel to the x-axis (longitudinal axis of the aircraft), to the y-axis (transverse axis of the aircraft) and to the z-axis (vertical axis of the aircraft). To achieve the redundancy or reliability generally required according to the general design criteria, at least two each of these coupling members are additionally provided.

SUMMARY OF THE INVENTION

The object of the invention is to provide an aerofoil connection for an aircraft, in particular a high-wing aircraft or a shoulder wing aircraft, which, compared to the previously known embodiments, allows a significant reduction in weight.

This object is achieved by a device which has the features of claim 1.

The arrangement in the region of two longitudinal edges of a fuselage airframe recess of in each case at least two z-coupling members extending substantially parallel to a vertical axis of the aircraft and in each case at least two xz-coupling members produces a considerable reduction in weight compared to conventional embodiments of aerofoil connections. This weight reduction is achieved according to the invention, inter alia, by a reduced number of coupling members, which in turn is a result of the provision of, for example, only four xz-coupling members, which are configured in each case for a first maximum of a load in the event of a crash and of a load in normal flight operation parallel to a longitudinal axis (x) of the aircraft and for a second maximum of a load in the event of a crash and of a load in normal flight operation parallel to a vertical axis (z). The mentioned loads are, for example, nominally determined loads which the connection must be able to withstand in the event of a crash or during normal flight operation.

Since the in each case two xz-coupling members arranged on both sides of the fuselage airframe recess are capable of absorbing in each case the loads which arise in the event of a crash and during normal flight operation parallel to the x-axis and to the y-axis, it is possible for the z-coupling members and x-coupling members, which hitherto have each been provided in duplicate per longitudinal edge of the recess due to the required reliability, to be replaced by merely two combined xz-coupling members, which means that the weight is reduced. The weight reducing potential results, inter alia, from the fact that the x-coupling members, which have hitherto only been configured for the x-loads and thus have been solid in view of the extremely high crash loads, are now also used for transferring the z-loads which arise during normal flight operation but are significantly lower compared to the crash loads.

This functional integration between the z-coupling members and the x-coupling members is possible according to the invention without restricting the overall functionality or reliability, since the occurrence of a crash situation and the loading case of the failure of an individual coupling member of the aerofoil connection are mutually exclusive under all conceivable operating conditions of the aircraft.

According to an advantageous embodiment, the xz-coupling members are each configured parallel to the vertical axis for loading in normal flight operation and parallel to the longitudinal axis for loading in the event of a crash. This is particularly advantageous, since in normal flight operation, particularly during take-off when the fuel tanks located in the aerofoils are typically full and make the aerofoils very heavy, and during flight operation when the fuselage is fully loaded, forces can arise in the z-direction which exceed forces arising in the z-direction in the event of a crash.

According to a further embodiment of the connection, the xz-coupling members each extend substantially at an angle to the longitudinal axis of the aircraft, i.e. the x-direction, the tangent of which angle is equal to the second maximum load divided by the first maximum load. This extending direction allows the xz-coupling members, with a particularly low dead weight, to absorb forces arising parallel to the longitudinal axis of the aircraft as well as forces arising parallel to the vertical axis of the aircraft up to the respective maximum load.

According to a further embodiment of the connection, in each case at least two y-coupling members are arranged substantially parallel to a transverse axis of the aircraft in the region of the longitudinal edges of the fuselage airframe recess.

This embodiment allows the aerofoil connection according to the invention to also transfer forces transversely to the flight direction from the aerofoil to the fuselage airframe.

An advantageous development of the invention provides that the xz-coupling members each comprise a fuselage airframe bearing arranged on the fuselage airframe and an aerofoil bearing attached to the aerofoil which are articulated to one another in each case by two xz-straps.

This configuration of the xz-coupling members with two pivots allows an at least slight parallel displaceability of the aerofoil in relation to the fuselage airframe. Nevertheless, a statically adequately determined connection between the aerofoil and the fuselage airframe is achieved in connection with the remaining y-coupling members and the z-coupling members.

According to a further embodiment of the connection, in each case at least two xz-straps are arranged opposite one another and inclined with respect to a longitudinal axis (x-axis) of the aircraft in the region of a longitudinal edge of the fuselage airframe recess.

If, for example, a z-coupling member fails in the region of the leading aerofoil edge, forces will act on the front xz-coupling member, positioned behind, which forces are smaller than would be the case during the failure of a z-coupling member in the region of the trailing aerofoil edge and the associated rear xz-coupling member. The reason for this asymmetry of the forces arising should a z-coupling member fail is a non-uniform distribution of mass between the aerofoil and the fuselage. The connecting straps, in a varying oppositely inclined arrangement, of the xz-coupling members compensate for these forces of varying strengths. The failure of a z-coupling member or of another coupling member can be caused, for example, by fatigue effects, corrosion phenomena or bombardment.

An imaginary auxiliary straight line, the centre of which ideally approximately coincides with the common centre of gravity of the connected aerofoil and fuselage airframe, passes through the two intersection points of the inclined longitudinal axes of the in each case two xz-coupling members provided on both sides in the connection region.

Further advantageous embodiments of the aerofoil connection are set out in the further claims.

DESCRIPTION OF EXEMPLARY EMBODIMENTS

Figure 1:
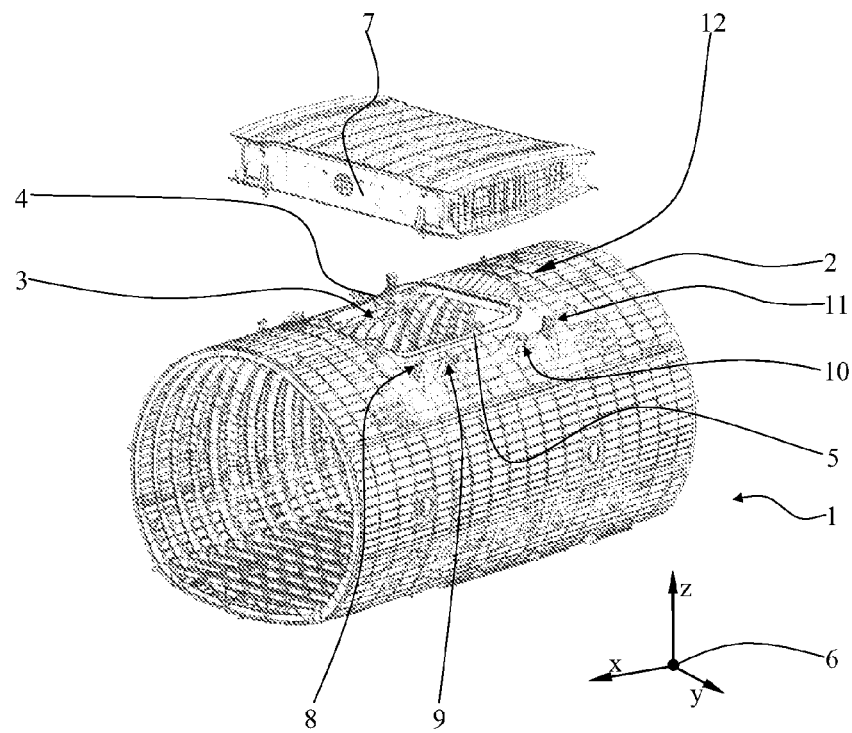
FIG. 1 is a perspective overview of a portion of a fuselage airframe with part of an aerofoil shown above separately.

In the drawings, the same constructive elements have the same reference numerals in each case.

FIG. 1 shows a basic overview of a portion of a fuselage airframe of a high-wing aircraft with part of an aerofoil with the associated components of an aerofoil connection.

In a fuselage airframe 1 of an aircraft in the conventional high-wing or shoulder wing method of construction, an approximately rectangular fuselage airframe recess 3 with two longitudinal edges 4, 5 extending parallel to an aircraft longitudinal axis is introduced over the region of an upper shell 2. A coordinate system 6 illustrates the spatial position of all the components. The x-axis of the coordinate system 6 extends parallel to the longitudinal axis of the aircraft and is directed in the flight direction. The y-axis or the (aircraft) transverse axis extends transversely to the longitudinal axis of the aircraft and, seen in the direction of flight, is oriented to the left, while the z-axis extends parallel to the vertical axis of the aircraft and is directed away from the floor. Shown above the fuselage airframe recess 3 at a distance from the fuselage airframe portion 1 (for a clearer overview) is a central part of the aerofoil 7 (aerofoil box) of the aircraft.

Furthermore, FIG. 1 shows a plurality of coupling members, of which only the two z-coupling members 8, 11 positioned in the region of the leading longitudinal edge 5, and the two xz-coupling members 9, 10 have been given a reference numeral in representation of the other coupling members of the wing connection which are partly covered by the fuselage airframe 1. A total of four y-coupling members which are also present have not been shown for reasons of clarity. Altogether, the coupling members form a connection 12 configured according to the invention to connect the aerofoil 7 to the fuselage airframe portion 1 of the aircraft, the full length of which is not shown.

Figure 2:
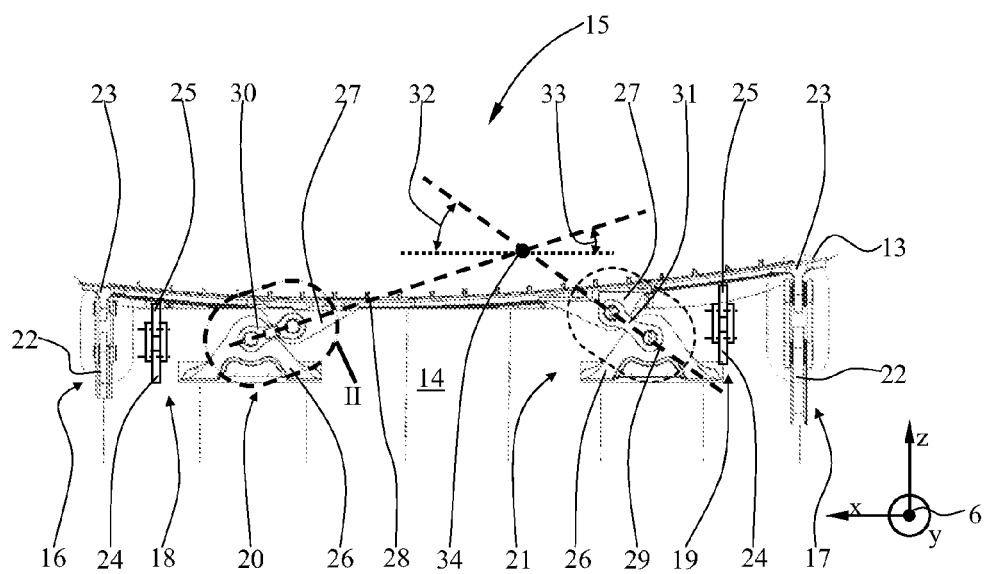
FIG. 2 is a cross-sectional view through an assembled aerofoil connection.

FIG. 2 is a cross-sectional view through a connection according to the invention between an aerofoil and a fuselage airframe of an aircraft in the region of a longitudinal edge of a fuselage airframe detail.

An aerofoil 13 is arranged above a fuselage airframe 14. A connection 15 between the aerofoil 13 and the fuselage airframe 14 comprises two z-coupling members 16, 17, two y-coupling members 18, 19 and two xz-coupling members 20, 21 which are each preferably configured for transferring forces parallel to the z-axis, to the y-axis and to the combined xz-direction. A grouping of a further six z-, y- and xz-coupling members which is configured in accordance with the arrangement of the coupling members 16 to 21 but is not shown in FIG. 2 is provided in the region of the second longitudinal edge (not visible) of the fuselage airframe recess.

Each of the two z-coupling members 16, 17 has a z-fuselage airframe bearing 22 and a z-aerofoil bearing 23 which are articulated to one another in each case by two z-straps and associated bolts (not shown). Due to the two pivots thus formed, each z-coupling member has a sufficient degree of freedom to prevent the development of mechanical tensile forces during relative movements between the aerofoil 13 and the fuselage airframe 14. Accordingly, the two y-coupling members 18, 19 also have in each case a y-fuselage airframe bearing 24 and a y-aerofoil bearing 25 which are linked to one another by in each case two straps. The same applies to the two combined xz-coupling members 20, 21 in each case which have an xz-fuselage airframe bearing 26 and an xz-aerofoil bearing 27 connected by two straps.

The fuselage airframe bearings 22, 24, 26 and the aerofoil bearings 23, 25, 27 are preferably configured as lugs, on both sides of which a strap rests with in each case an end hole. The straps and the lugs are connected in the fuselage airframe bearings and aerofoil bearings by two bolts per coupling member 16 to 21 in each case. Other constructive embodiments of the fuselage airframe bearings 22, 24, 26 and of the aerofoil bearings 23, 25, 27 as part of the coupling members are possible.

Both longitudinal axes 28, 29 of the xz-straps 30, 31 extend in an opposite inclination and with angles 32, 33 or inclinations of different sizes with respect to the horizontal, i.e. in relation to the x-axis of the coordinate system 6.

Due to the different inclination of the longitudinal axes 28, 29, it is taken into account that during normal flight operation as well as in the event of a failure mechanical forces of different magnitudes act from, for example, one of the two outer z-coupling members 16, 17, on the two xz-coupling members 20, 21. Due to the different inclination of the longitudinal axes 28, 29 and different spacings between the xz-coupling members 20, 21 and the z-coupling members 16, 17, different leverage effects are produced which compensate for these mutually differing force effects. In this respect, the greater the angles 32, 33 of the longitudinal axes 28, 29 are selected to be, the greater in each case a z-component becomes of a total force acting on the respective xz-coupling member 20, 21, while conversely the x-component of the total force is reduced. An imaginary straight line, the centre of which approximately coincides with a common centre of gravity or force equilibrium of the aerofoil 13 and the fuselage airframe 14, extends parallel to the y-axis (perpendicular to the plane of the drawing) through an intersection point 34 between the two longitudinal axes 28, 29 and a further longitudinal axis intersection point (not shown in FIG. 2) of the two other xz-coupling members, being vertically offset behind the plane of the drawing, of the connection 15. This centre of the imaginary straight line can be positioned above the fuselage airframe 14 in the region of the aerofoil 13 or below the aerofoil 13 in the region of the fuselage airframe 14.

During the construction of the illustrated aerofoil connection, the nominal load arising in the x-direction in the event of a crash, the nominal load arising in the z-direction in the event of a crash, the nominal load arising in the x-direction during normal flight and landing operation and the nominal load arising in the z-direction during normal flight and landing operation is determined, for example for each of the xz-straps 30, 31. Thereafter, an associated first vertical maximum load in the x-direction is also determined for each of the xz-straps 30, 31 from the nominal load arising in the x-direction in the event of a crash and the nominal load arising in the x-direction during normal flight and landing operation, in that the larger of the two values is selected. Likewise, an associated second horizontal maximum load in the z-direction is determined for each of the xz-straps 30, 31 from the nominal load arising in the z-direction in the event of a crash and the nominal load arising in the z-direction during normal flight and landing operation. In the case of a typical high-wing aircraft, for example the nominal load in the z-direction in the event of a crash is determined as the first maximum load and the nominal load in the x-direction during normal flight and landing operation is determined as the second maximum load.

For each xz-strap 30, 31, the associated angle 32, 33 of the extending direction is then determined as the arc tangent of a quotient which is produced by dividing the associated vertical maximum load by the horizontal maximum load at the same place. Each xz-strap 30, 31 is configured with a strength such that on the one hand it can be loaded in the x-direction up to the first maximum load and on the other hand it can be loaded in the z-direction up to the second maximum load.

Figure 3:
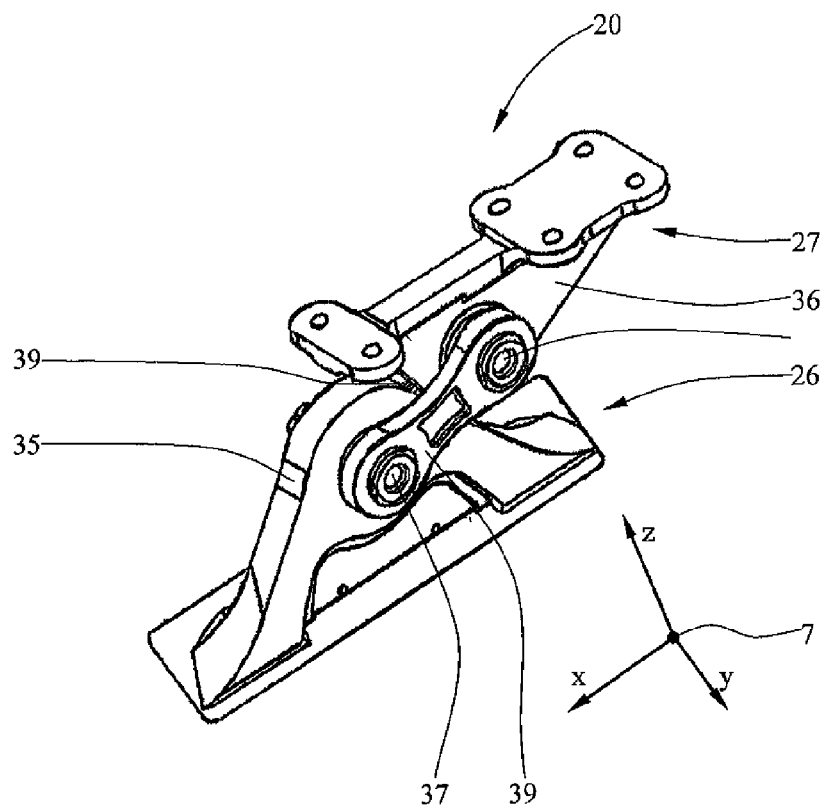
FIG. 3 is an enlarged isometric view of an xz-coupling member from FIG. 2 as part of the aerofoil connection.

FIG. 3 is an isometric view of an xz-coupling member from FIG. 2 of the aerofoil connection. The xz-coupling member 20 comprises, inter alia, the xz-fuselage airframe bearing 26 and the xz-aerofoil bearing 27 (cf. in particular FIG. 2). Both the xz-fuselage airframe bearing 26 and the xz-aerofoil bearing 27 have at least one flange portion (not shown) which is horizontal, i.e. parallel to the xy-plane of the coordinate system 6, and which effects the mechanical connection to the fuselage airframe or the aerofoil. This mechanical connection can be made, for example, by conventional screw and/or rivet connections. In the illustrated embodiment, the xz-fuselage airframe bearing 26 and the xz-aerofoil bearing 27 are each configured as a lug 35, 36 with a hole (not shown in detail), a bolt 37, 38 being guided through the hole in each case. On the front, the strap 30 is arranged on the bolt 37, 38, while on the rear, an almost completely covered second strap 39 articulates the two bolts 37, 38 to one another. A symmetrical force transition is provided inside the coupling member 20 due to the straps 30, 39 which rest on both sides of the lugs 35, 36.

The basic structure of the z-coupling members and of the y-coupling members with in each case a lug-shaped fuselage airframe bearing and a lug-shaped aerofoil bearing which are articulated to one another by two straps and two bolts to produce the actual coupling member follows the construction described with reference to the xz-coupling member.

Thus, a z-coupling member comprises a z-fuselage airframe bearing and a z-aerofoil bearing which are preferably both configured as lugs. Guided through the two lugs in each case is a bolt, on both sides of which z-straps are arranged and secured to produce a double-jointed connection. The z-straps have, for example, an elongate oval shape, a hole being made in each end to receive the bolts. The construction of the y-coupling member corresponds to that of the z-coupling member.

Figure 4:
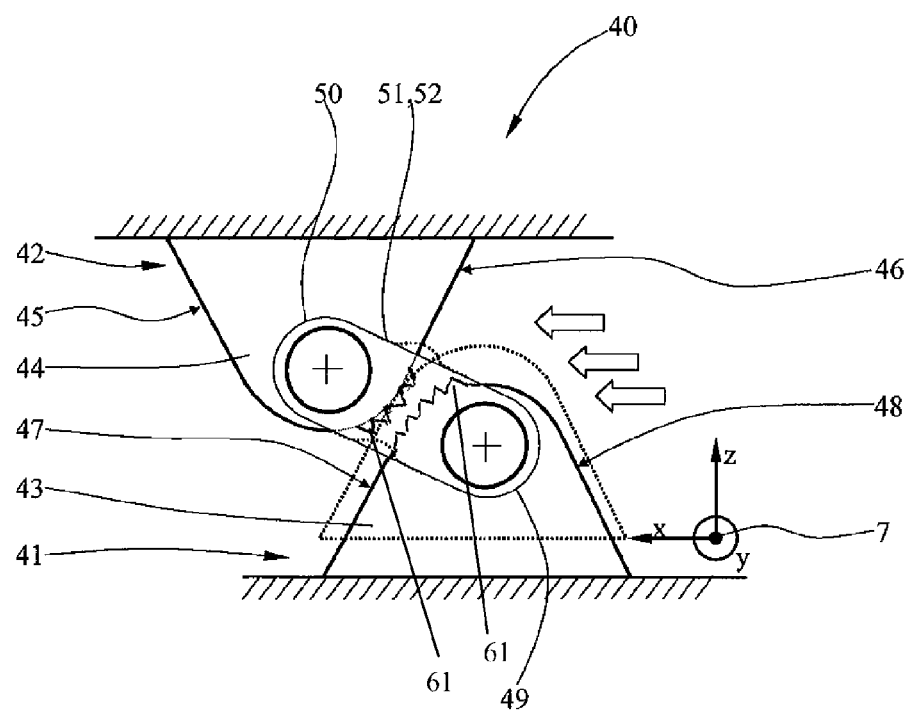
FIG. 4 is a side view of an alternative embodiment of an xz-coupling member for the weight-optimised transfer of crash loads.

FIG. 4 is a side view of a modified configuration of an xz-coupling member for the weight-optimised transfer of crash loads. Here, too, the coordinate system 6 illustrates the spatial position of all components.

An xz-coupling member 40 comprises an xz-fuselage airframe bearing 41 and an xz-aerofoil bearing 42 which are configured as lugs 43, 44. The geometric shape of the upper lug 43 approximately follows an upside-down capital "A" with two oppositely inclined side faces 45, 46. Accordingly, the peripheral contour of the lower lug 44 follows the Latin capital letter "A" in a normal orientation, likewise with two oppositely inclined side faces 47, 48. Each of the two lugs 43, 44 has a hole (not shown), through which two bolts 49, 50 are guided. Arranged on the bolts 49, 50 on both sides of the lugs 43, 44 are substantially oval xz-straps 51, 52 to produce a double-jointed connection between the xz-fuselage airframe bearing 41 and the xz-aerofoil bearing 42. Alternative forms of construction can be used instead of the described variant of the xz-fuselage airframe bearing 41 and of the xz-aerofoil bearing 42. However, in this variant, at least the xz-straps 51, 52 of the xz-coupling member 40 are dimensioned to be mechanically weaker compared to the initially described variant, so that in the event of a crash where in particular extremely high loads occur in the direction of the x-axis of the coordinate system 6 (direction of flight of the aircraft), there is an energy-absorbing compression or deformation of the two xz-straps 51, 52 of the xz-coupling member 40. As a result of this compression of the two xz-straps 51, 52, the side faces 46, 47 of the two lugs 43, 44 are brought into direct mutual mechanical contact, as indicated by the dotted outline of the lower lug 43 and, regardless of the deformation already effected on the xz-straps 51, 52, the impact energy which still remains is completely absorbed or transferred by the xz-coupling member 40. The xz-straps 51, 52 are deformed substantially parallel to the y-axis, said straps 51, 52 not breaking in the event of a crash, so that the mechanical connection between the lugs 43, 44 and the bolts 49, 50 and thus the operation of the coupling member 40 is maintained at all times.

With this variant, it is possible to achieve a further weight reduction as a result of the statically lighter configuration of the xz-straps 51, 52 and of the bolts 49, 50. Furthermore, it is possible to configure the superficial shape of the two side faces 46, 47 to be complementary to one another, so that in the event of a crash there is positive locking at least in certain regions between the lugs 43, 44. This prevents an uncontrolled displacement of the lugs 43, 44 relative to one another. For this purpose, each of the side faces 46, 47 can be provided, for example, with teeth 61 which, in the event of a crash, i.e. if the side faces 46, 47 come into direct mechanical contact with one another due to the severe deformation of the xz-straps 51, 52, will mesh at least in certain regions.

Furthermore, this configuration of the xz-coupling member 40 has the advantage that there is no abrupt absorption of energy in the event of a crash. Due to the initial compression of the xz-straps 51, 52, first of all some of the kinetic energy occurring in a crash is reduced with a time delay conditioned by the deformation. Only after the side faces 46, 47 have entered into the intended firm mechanical contact is the impact energy, which has already been considerably reduced due to the compression of the xz-straps 51, 52, transferred by the coupling member 40.

Figure 5:
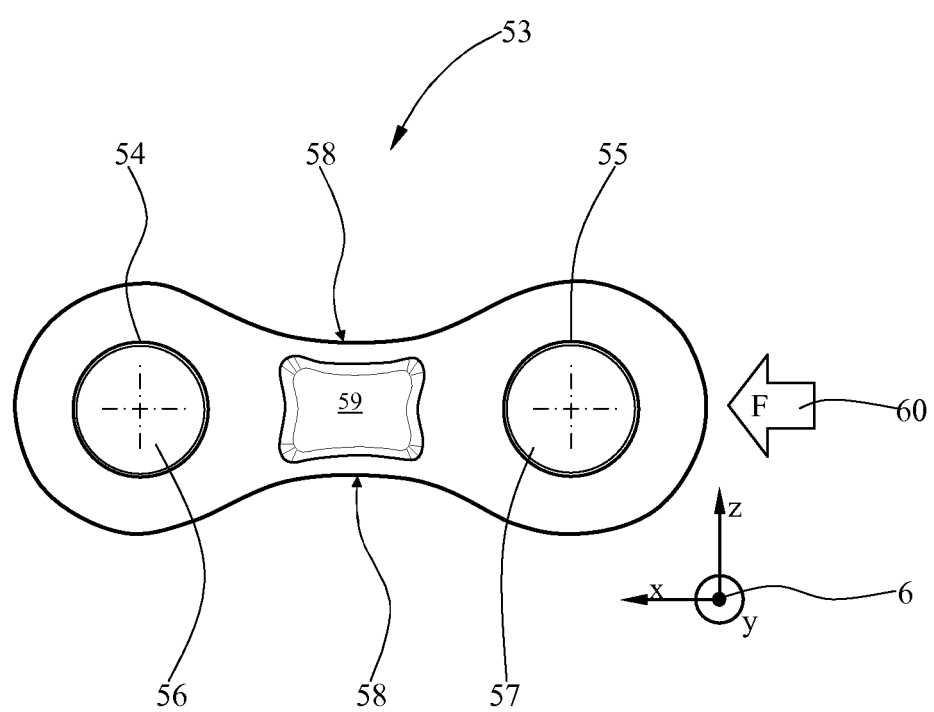
FIG. 5 is a detailed plan view of a variant of an xz-strap for the weight-optimised transfer of crash loads with an integrated weakened zone.

FIG. 5 is a detailed plan view of a modified variant of an xz-strap with a predefined weakened zone for an xz-coupling member to absorb crash loads. The coordinate system 6 is used to show the spatial position of the components and the directions of movement.

An xz-strap 53 has two holes 54, 55 arranged in the ends thereof to receive two bolts 56, 57. For each xz-coupling member, two such xz-straps and two bolts 56, 57 are required, the xz-straps resting against both sides of the xz-fuselage airframe bearing and the xz-aerofoil bearing. The two bolts 56, 57, in conjunction with two xz-straps 53, produce a double-jointed connection as an xz-coupling member between an xz-fuselage airframe bearing (not shown) and an xz-aerofoil bearing (likewise not shown) (cf. FIG. 2).

A peripheral contour of the xz-strap 53 approximately follows that of an oval but has a constricted region 58 with oppositely (mirror-inverted) curved edges on both sides in a central portion between the holes 54, 55. In the constricted region 58 is a weakened zone 59 with an approximately rectangular basic shape, although the sides of the rectangular basic shape are each slightly constricted towards their centre. In the region of the weakened zone 59, the material thickness of the xz-strap 53, preferably produced using a titanium alloy and/or titanium, is reduced to ensure a defined compression of the xz-strap 53 in the event of a crash, in which case the xz-strap 53 would bend out of the plane of the drawing in the direction of the y-axis. A weakened zone 59 of this type can be provided on only an upper side, as shown, and/or on a lower side of the xz-strap 53.

In the event of the aircraft crashing, i.e. if a high deceleration acts suddenly against the direction of the x-axis of the coordinate system 6, a strong force F acts in the direction of the white arrow 60 on the xz-strap 53. The accelerations of up to 9 g which occur are usually higher by a factor of three than the loads which occur in normal flight operation. Compared to the first variant of the aerofoil connection (cf. FIGS. 1 to 3), the bolts 56, 57 and the bearings (not shown in FIG. 5) on the fuselage airframe and on the aerofoil as part of the aerofoil connection are dimensioned such that the standard flight loads which occur, with an increased safety margin, are only just reliably maintained. Further weight reductions can be achieved as a result of this lighter configuration of the fuselage airframe bearings, the aerofoil bearings and the bolts.

However, the xz-straps 53 which are modified according to FIG. 5 must be used inside the connection of the aerofoil in the region of the front xz-coupling member (cf. in particular FIG. 2, reference numeral 20), since only in the region of this xz-coupling member do compressive forces arise which initiate the desired compression of the xz-straps. In contrast, in the region of the rear xz-coupling member, only strong tensile forces arise in the direction of flight in the event of a crash due to the forward displacement of the aerofoil, which tensile forces cannot be utilised for the intended compression process.

In the event of a crash, the exactly predefined structural overload occurs in the constricted region 58 of the xz-strap 53, as a result of which the xz-strap 53 is compressed or bent (parallel to the y-axis) out of the plane of the drawing in the view of FIG. 5, but no break occurs so that the xz-coupling member still performs its connection action. At the end of the deformation process of the xz-strap 53, at least certain regions of the fuselage airframe bearing rest against the aerofoil bearing in a positive-locking manner, a secure guidance on both sides being ensured by the compressed xz-straps 53 which rest against both sides of the bearings.

LIST OF REFERENCE NUMERALS 1 fuselage airframe
2 upper shell
3 fuselage airframe recess
4 longitudinal edge
5 longitudinal edge
6 coordinate system
7 aerofoil
8 z-coupling member
9 xz-coupling member
10 xz-coupling member
11 z-coupling member
12 connection (aerofoil connection)
13 aerofoil
14 fuselage airframe
15 connection (aerofoil connection)
16 z-coupling member
17 z-coupling member
18 y-coupling member    } left-hand side part of
19 y-coupling member    } connection
20 xz-coupling member
21 xz-coupling member
22 z-fuselage airframe bearing
23 z-aerofoil bearing
24 y-fuselage airframe bearing
25 y-aerofoil bearing
26 xz-fuselage airframe bearing -continued

| | | |
|---|---|---|
| 27 | xz-aerofoil bearing | |
| 28 | longitudinal axis (xz-strap) | |
| 29 | longitudinal axis (xz-strap) | |
| 30 | xz-strap | |
| 31 | xz-strap | |
| 32 | angle | |
| 33 | angle | |
| 34 | intersection point (longitudial axes of xz-straps) | |
| 35 | lug | |
| 36 | lug | |
| 37 | bolt | xz-coupling member |
| 38 | bolt | |
| 39 | xz-strap | |
| 40 | xz-coupling member | |
| 41 | xz-fuselage airframe bearing | |
| 42 | xz-aerofoil bearing | |
| 43 | lug | |
| 44 | lug | |
| 45 | side face | |
| 46 | side face | |
| 47 | side face | |
| 48 | side face | |
| 49 | bolt | |
| 50 | bolt | |
| 51 | xz-strap | |
| 52 | xz-strap | |
| 53 | xz-strap | |
| 54 | hole | |
| 55 | hole | |
| 56 | bolt | |
| 57 | bolt | |
| 58 | constricted region | |
| 59 | weakened zone | |
| 60 | arrow (main force flow direction in a crash) | |
| 61 | teeth | |

The invention claimed is:

1. A connection of an aerofoil to a fuselage airframe of an aircraft comprising a plurality of coupling members, in each case at least two z-coupling members which extend substantially parallel to a vertical axis of the aircraft and in each case at least two xz-coupling members being arranged in a region of two longitudinal edges of a fuselage airframe recess, wherein the spaces between the xz-coupling members and the z-coupling members are different and the xz-coupling members each comprising an xz-fuselage airframe bearing arranged on the fuselage airframe and an xz-aerofoil bearing attached to the aerofoil which are articulated to one another by two xz-straps which are inclined with respect to a longitudinal axis of the aircraft, wherein both longitudinal axes of the two xz-straps extend in an opposite inclination and with inclinations of different sizes with respect to a horizontal to compensate differing force effects, wherein the xz-straps of at least one xz-coupling member are configured such that, in the event of a crash, an energy-absorbing compression of the xz-straps occurs, as a result of which a side face of the xz-fuselage airframe bearing and a side face of the xz-aerofoil bearing are brought into direct mechanical contact, wherein the side faces are each provided with teeth which, in the event of a crash, mesh at least in a plurality of teeth, and wherein the xz-straps of the xz-coupling member comprise at least one of an elongate oval shape, a statically light configuration or have at least one weakened zone to allow a defined deformation of the xz-strap in the event of the aircraft crashing, so that impact energy is transferred by the xz-coupling member.

2. The connection according to claim 1, wherein a superficial shape of the side faces of the xz-fuselage airframe bearing and of the xz-aerofoil bearing are configured to be complementary to one another.

3. The connection according to claim 1, wherein in the region of the longitudinal edges at least two y-coupling members are arranged substantially parallel to a transverse axis of the aircraft.

4. The connection according to claim 1, wherein the at least two xz-straps are in an opposite and inclined arrangement with respect to a longitudinal axis of the aircraft in the region of a longitudinal edge.

5. The connection according to claim 1, wherein each xz-strap has two holes for two bolts.

6. The connection according to claim 1, wherein the z-coupling members each comprise a z-fuselage airframe bearing arranged on the fuselage airframe and a z-aerofoil bearing attached to the aerofoil.

7. The connection according to claim 3, wherein the y-coupling members each comprise a y-fuselage airframe bearing arranged on the fuselage airframe and a y-aerofoil bearing attached to the aerofoil which are articulated to one another by two y-straps with two holes and two bolts.

8. The connection according to claim 1, wherein longitudinal axes of two xz-straps intersect one another in the region of a longitudinal edge.

9. The connection according to claim 1, wherein the coupling members are preferably formed using at least one of titanium alloy or titanium.

10. The connection according to claim 1, wherein the two xz-straps have at least one weakened zone to allow a defined deformation of the xz-strap in the event of the aircraft crashing.

11. The connection according to claim 1, wherein the connection is a connection of a high-wing aircraft.

* * * * *